E. W. BENDER.
ELECTRIC MOTOR VEHICLE.
APPLICATION FILED JULY 13, 1910.
1,017,198.
Patented Feb. 13, 1912.
5 SHEETS—SHEET 3.
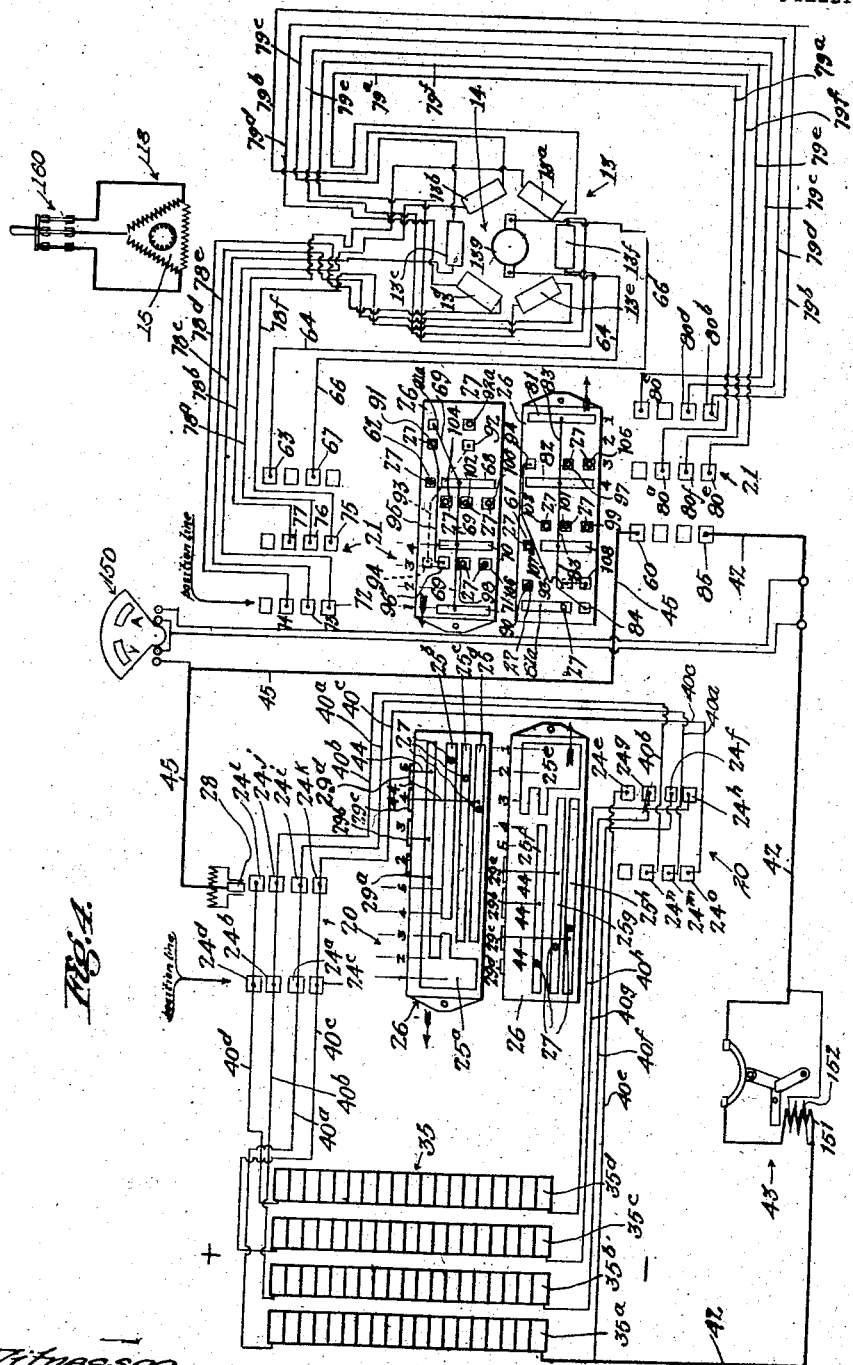
Witnesses
Edward H. Barkelew
Hal M. Sloman
Inventor:
Elmore W. Bender
By James T. Barkelew
his Attorney

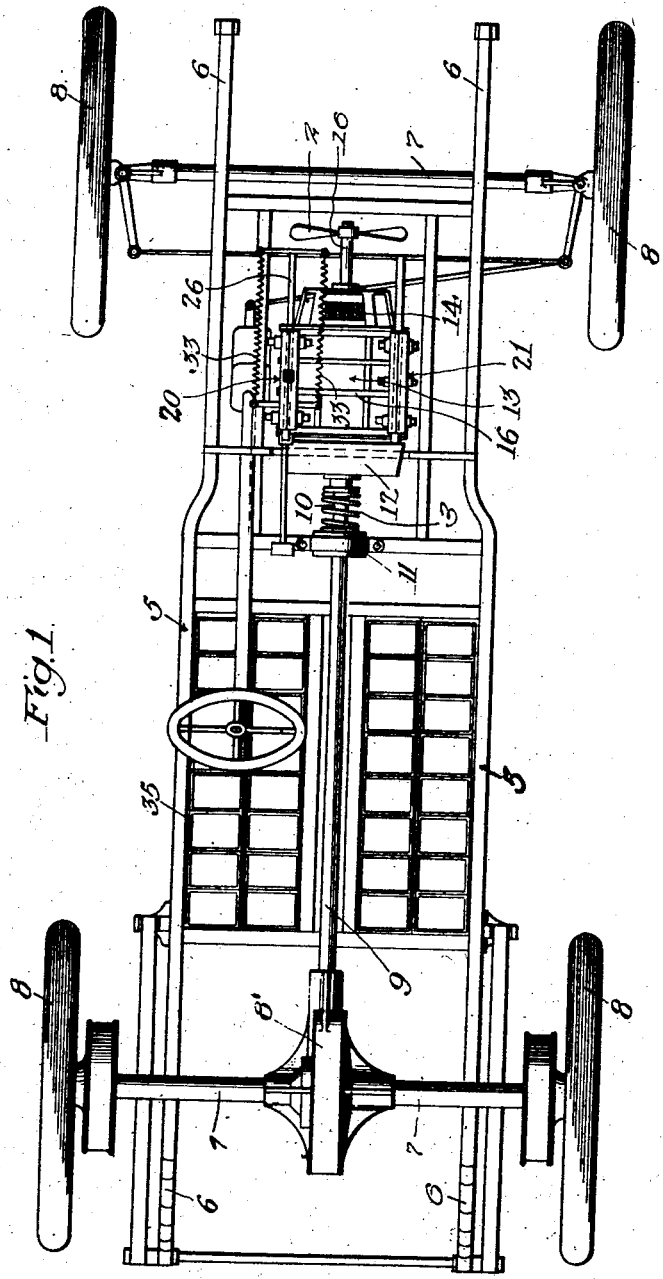

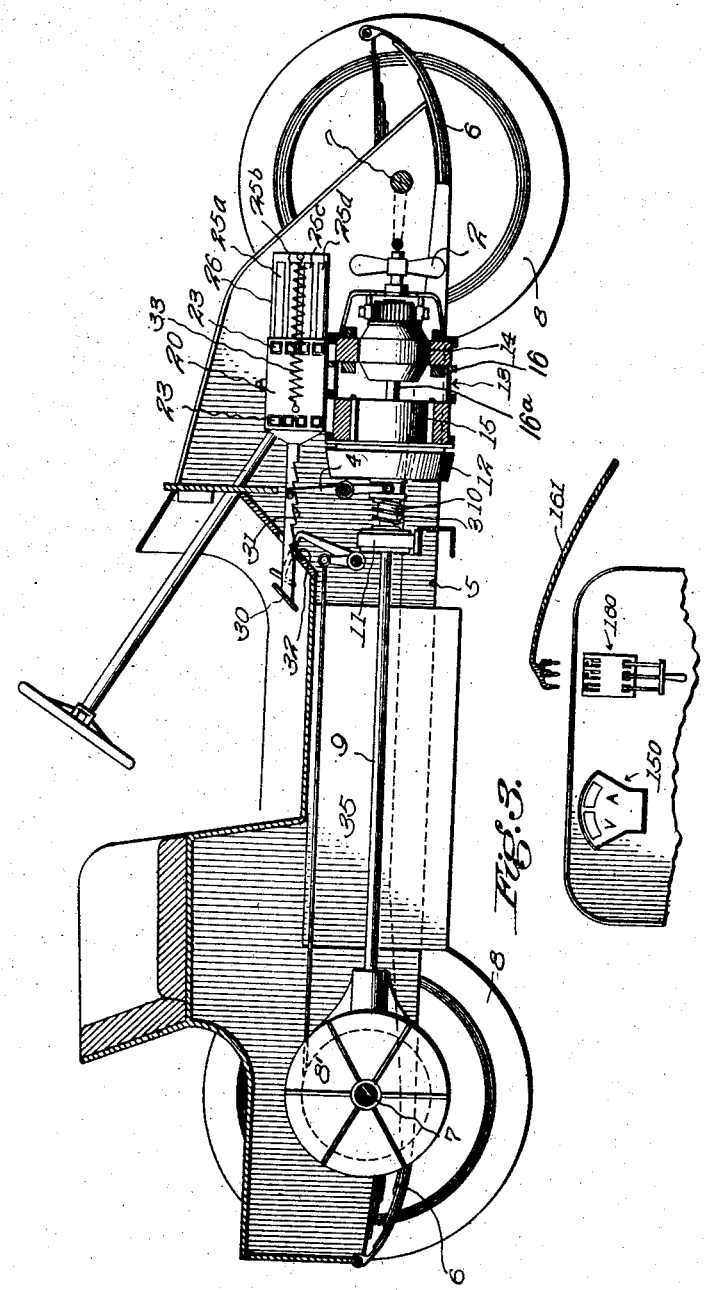

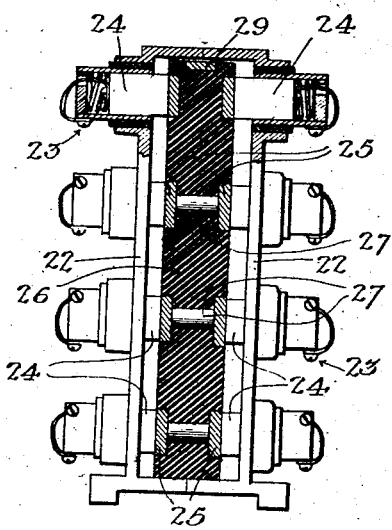
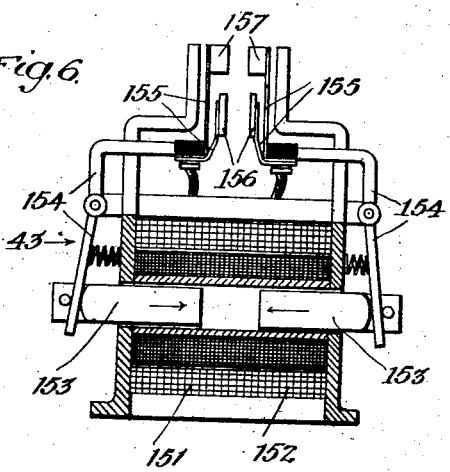

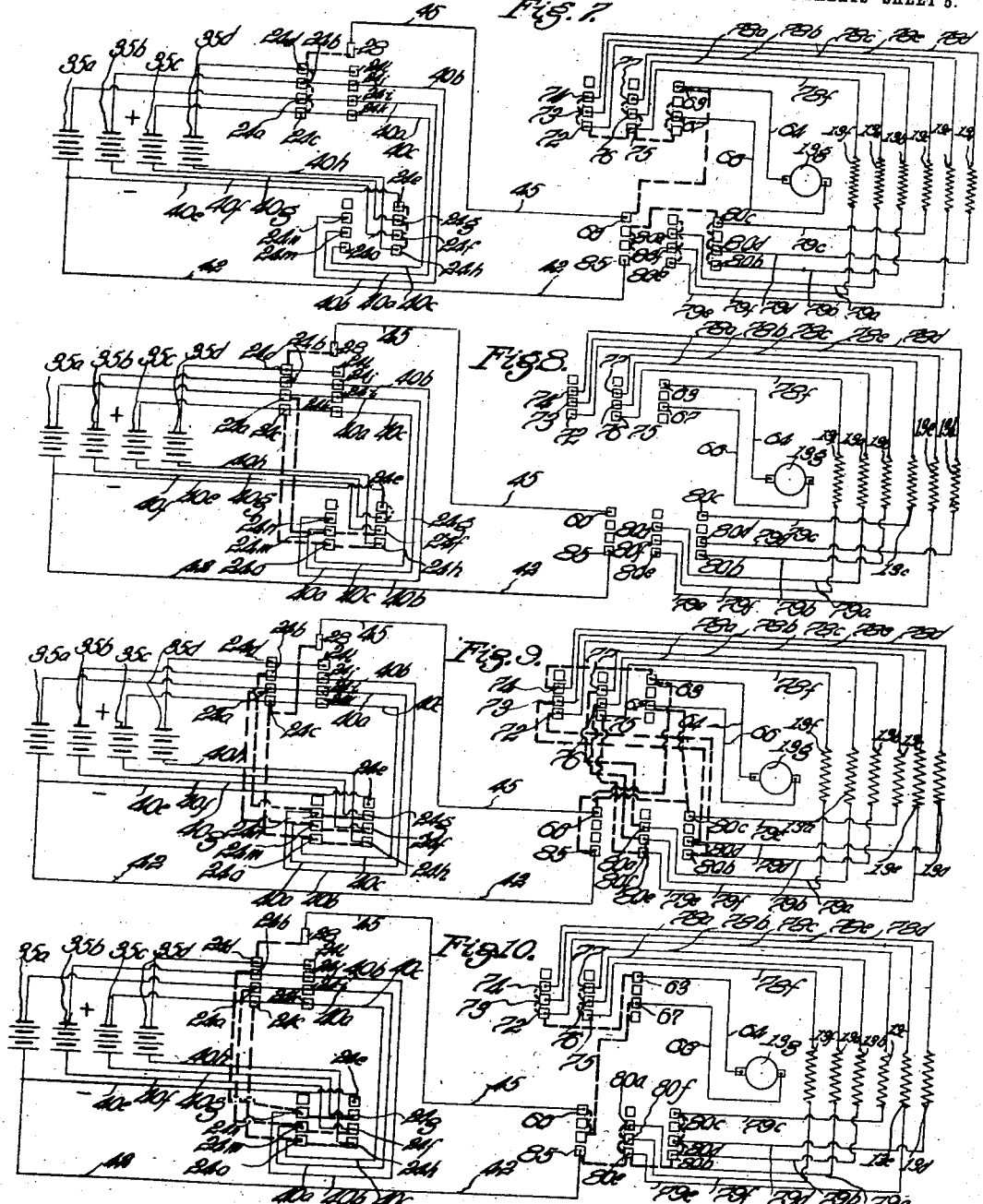

UNITED STATES PATENT OFFICE.

ELMORE W. BENDER, OF LOS ANGELES, CALIFORNIA.

ELECTRIC MOTOR-VEHICLE.

1,017,198. Specification of Letters Patent. Patented Feb. 13, 1912.

Application filed July 13, 1910. Serial No. 571,703.

*To all whom it may concern:*

Be it known that I, ELMORE W. BENDER, a citizen of the United States, residing at Los Angeles, in the county of Los Angeles and State of California, have invented new and useful Improvements in Electric Motor-Vehicles, of which the following is a specification.

This invention relates to improvements in motor vehicles propelled by electric power derived from a storage battery or other accumulator source carried by the vehicle.

The invention relates more particularly to a motor vehicle with a "charging plant" by means of which the storage batteries may be charged with energy obtained from an alternating electrical system. Ordinarily direct current must be obtained from some electric source in order to charge the storage battery carried by an electric motor vehicle. Direct current is usually difficult to obtain, alternating current being much more prevalent than direct for lighting and small power purposes; or, if direct current is obtainable, it is usually at a high voltage and not suitable for battery charging. By equipping a machine with a rectifying mechanism, it is possible to charge the batteries by the initial use of alternating current or high potential current. In practice, these converters are best supplied by motor-generators, that is, mechanisms which will either act as a motor or as a generator. It is necessary that the direct current converter be both a motor and a generator; it is only necessary that the alternating current converter be a motor. The direct current motor generator is adapted to be electrically connected through a pair of controllers to the storage battery carried by the vehicle. It is mechanically connected to a running gear of the vehicle for purposes of propulsion, and it is also mechanically connected to the alternating current motor.

Within a machine of the above broad description, my invention consists particularly in the method of control of the battery and direct current motor-generator. The batteries are arranged in a suitable number of sections, each division furnishing the same voltage as any other division. A battery controller is arranged to connect the battery sections in several different manners, so that the voltage supplied to the motor generator may be varied at will, thus controlling the speed and power of the motor. The motor controller is arranged to make different arrangements of the windings within the motor-generator. The field coils may be connected in parallel, series parallel, or series with each other and either partly or wholly in series or parallel with the armature. These varying connections provide for using the motor generator as a series motor in either direction of rotation, or as a shunt or compound motor or generator. Different positions and corresponding connections for the different arrangements will be explained more fully in the following specification.

A set of indicating instruments are provided, including a volt meter and an ammeter. Both instruments are attached at suitable points in the circuit, the voltmeter registering the voltage of the batteries and the ammeter registering the amount of circuit delivered to or taken from the motor generator. A magnetic circuit breaker of peculiar design is also connected in the main circuit between the batteries and the motor generator. This circuit breaker is provided with two windings, one fine and one coarse. The fine winding is designed to carry a shunted circuit around the breaking point and to consequently form a magnetic field at all times when the exterior controllers are in position to close the circuit. The magnetism of this shunt field is never sufficient to break the main circuit, a series winding being used for that purpose. However, when the circuit has been broken, the shunt field is of sufficient strength and will hold the gap open.

In the accompanying drawings: Figure 1 is a plan view of the chassis of a motor vehicle equipped with my invention. Fig. 2 is a longitudinal vertical section of a motor vehicle equipped with my invention. Fig. 3 is a view of a portion of the dash showing the meters and switch mounted thereon. Fig. 4 is a diagrammatic view showing the connections of the complete electrical arrangement. Fig. 5 is an enlarged sectional detail showing the construction of one of the controllers. Fig. 6 is a view showing the magnetic cut out. Figs. 7, 8, 9 and 10 are simplified diagrams illustrating the connections through the various circuits and controllers for different positions of the controllers.

In the drawings 5 designates the frame of an auto-vehicle mounted, through the medium of springs 6, on axles 7 carried by wheels 8 in the ordinary manner. In the drawings I have shown an underslung frame, but this may be arranged as is suited best to the vehicle. In the center of rear axle 7 I have shown a differential housing 8' which contains the usual differential gears driven by means of a shaft 9 extending longitudinally of the frame. Shaft 9 is connected to clutch shaft 10 through a universal joint 11. Clutch 12 is operated by spring 13 and lever 14 in the ordinary manner, connecting and disconnecting the shaft 9 to and from the motor-generator and rectifier unit 13. This unit is made up of a direct current motor-generator 14 and an alternating current motor 15 mounted on the same shaft $16^a$. The stationary portions of both machines are held in a single frame 16 and both armatures are mounted between a single set of bearings, making the whole device a single unit. On the upper part of this unit are mounted the two controllers, controller 20 for the batteries and controller 21 for the direct current motor generator. These controllers are both constructed with a casing frame 22 carrying a number of brush members 23 comprising spring supported brushes 24 which engage with contact strips 25 mounted in moving element 26 of the controller. Certain of the contact strips 25 opposite each other are connected through element 26 by studs 27, shown in Fig. 5 and indicated in Fig. 4. Element 26 has a movement of reciprocation in both controllers, this movement bringing different contact strips into engagement with the brushes and thereby forming different connections of the batteries and motor. Battery controller 20 also has a contact 28 adapted to engage with strips 29 set on the upper edge of elements 26. Motor controller 21 may be manipulated in any approved manner; but battery controller 20 is preferably manipulated through the medium of a foot pedal 30 having notches 31 for engagement with a piece 32, by which arrangement the movable member 26 is prevented from being moved toward the operator by springs 33 except when the operator desires such movement and raises the pedal. There are four working positions of each of the movable members of the controllers, as will be fully explained hereafter.

In the first of the four positions for the battery controller 20, the circuit to the motor is open and the battery 35 is connected so that its four divisions $35^a$, $35^b$, $35^c$, and $35^d$ are connected in multiple with each other. This provides that any inequalities in the battery voltage shall be equalized during the periods of rest of the battery. In the second position the connections of the battery remain the same as in the first position and the circuit to the motor through the motor controller 21 is closed. This supplies the motor with the minimum voltage—that is, the voltage of one section of the battery; while it equally discharges all sections of the battery. In the third position of the battery controller, the sections are connected in pairs and each of the series connected pairs is connected to the other in multiple. In the fourth position of the controller the motor is connected to three of the sections of the battery, connected in series. This gives the next step in voltage. In the fifth position the motor is connected to the whole battery which is connected in series, delivering the maximum voltage.

The direct current motor generator is provided typically with six field poles and windings $13^a$, $13^b$, $13^c$, $13^d$, $13^e$ and $13^f$. The terminals of each of these field windings are led independently to motor controller 21. The wires leading from armature $13^g$ are also directly connected to the motor-controller. The motor controller has four positions, just as the battery has four working positions. In its first position the motor-generator is connected in series to run in a forward direction as a motor—that is, to drive the vehicle forwardly. The armature and all field coils are connected in series with each other and with the batteries, the field coils being connected in multiple with each other. The second position entirely disconnects the battery circuit from the motor-generator and also entirely disconnects each of the field coils and the armature from each other. The third position of the motor controller is the position in which the battery may run the motor or the generator may charge the battery, according to which of the two raises the higher voltage. In this position of the controller the motor generator is connected in shunt, the field and armature being connected in multiple with each other and the single field coils connected in series with each other. In this arrangement the battery is connected to the armature so that the motor will be driven in a forward direction if the battery voltage is sufficiently high and so that the machine will act as a generator and charge the batteries if its voltage is higher than that of the batteries. This arrangement is very advantageous when the vehicle is traveling up and down grade, the machine immediately beginning to charge the battery whenever the vehicle runs down a grade sufficiently steep to drive the motor. In the fourth position of the motor controller, the motor is connected in series in the same fashion as in position 1 of the controller, with the exceptions that the connections are made so that the motor will rotate backward to drive the vehicle rearwardly. In this position the field and armature and battery are all connected in series, but the individual field coils are connected in parallel with each other.

The connections of the battery will first be followed out in detail, the description of the motor connections follow. The battery is divided into four sections 35$^a$, 35$^b$, 35$^c$ and 35$^d$. From the terminals of these sections wires 40$^a$, 40$^b$, 40$^c$ and 40$^d$ and wires 40$^e$, 40$^f$, 40$^g$ and 40$^h$ lead to controller 20. A single wire 42 leads from wire 41$^e$, and thence from battery section 35$^a$, through circuit breaker 43 and connects with motor controller 21. Wires 40$^a$—40$^h$ connect with brushes 24$^a$—24$^h$, respectively, brushes 24$^a$—24$^d$ being on the opposite side of the battery controller from brushes 24$^e$ to 24$^g$ (in the drawings the views of the brushes on opposite sides of the controller and of the opposite sides of the sliding contact element are taken as viewed from the respective sides, so that the brushes which are opposite each other in the actual construction are on opposite ends of the views). Wires 40$^a$ to 40$^d$ also connect to brushes 24$^i$—24$^l$ on the same side of the controller as brushes 24$^a$—24$^d$. Wires 40$^a$—40$^c$ also connect to brushes 24$^m$—24$^o$ on the same side of the controller as brushes 24$^e$—24$^h$.

Sliding contact element 26 carries four contact plates and strips on each side, contacts 25$^a$ to 25$^d$ being on the side of the element which engages with brushes 24$^a$—24$^d$ and 24$^i$—24$^l$ and contacts 25$^e$—25$^h$ being on the side of the member which engages with brushes 24$^e$—24$^h$ and 24$^m$—24$^o$. On the upper edge of sliding contact element 26 are mounted four contact strips 29$^a$ to 29$^d$ which are connected by wires 44 to the contact strips on the opposite sides of the sliding element. Certain of the contact strips on opposite sides of the sliding contact element are connected together through the element by means of studs 27.

In the first position of the contact slide, the slide is in such relation to the brushes that the position indicated 1 on the slide is directly under the center of brushes 24$^a$—24$^d$ and brushes 24$^e$—24$^h$. In this position brushes 24$^a$—24$^d$ will all be in contact with strip 25$^a$ and brushes 24$^e$—24$^h$ will all be in contact with strip 25$^e$. As the wires leading from the poles of the battery sections are connected to these brushes, all the like poles of the battery will be connected together. In this first position, contact 28 does not engage with any of the contact strips 29$^a$ to 29$^d$, and no current flows in the external circuit. The batteries are merely connected together in multiple to equalize any potential differences that may exist between them. In the second position, the batteries are all connected in the same manner, as the brushes named still engage with the same contact strips, but the movement of the slide to position 2 has moved contact 29$^a$ under contact 28 and the current of the batteries in multiple connection flows through wire 45 to controller 21, through controller 21 as will be hereinafter explained, through wire 42 and circuit breaker 43 to wire 40$^e$, thence through wire 40$^e$ to brush 24$^e$ and contact plate 25$^e$, whence it flows through brushes 24$^e$—24$^h$ and wires 40$^e$—40$^h$ to the other side of the batteries. This arrangement delivers to the main lines, 42 and 45, a voltage equal to that of a single section of battery.

When the slide is moved to its third position, brushes 24$^d$ and 24$^b$ still engage with contact plate 25$^a$, and brushes 24$^e$ and 24$^g$ still engage with contact plate 25$^e$. Brushes 24$^a$ and 24$^c$ engage with contact strips 25$^c$ and 25$^d$, and brushes 24$^f$ and 24$^h$ engage with contact strips 25$^g$ and 25$^h$. The battery is then connected in two divisions in multiple, each division comprising two sections in series. One of the sides, say the positive, of sections 35$^b$ and 35$^d$ are connected to contacts 24$^b$ and 24$^d$ which are connected together through contact plate 25$^a$. The negative sides of sections 35$^b$ and 35$^d$ are connected to brushes 24$^f$ and 24$^h$ which are in engagement with contact strips 25$^g$ and 25$^h$. The positive sides of sections 35$^a$ and 35$^c$ are connected through brushes 24$^a$ and 24$^c$ to contact strips 25$^c$ and 25$^d$. Contact strips 25$^c$ and 25$^d$ are connected through the slide to contact strips 25$^g$ and 25$^h$ and thence to the negative poles of battery sections 35$^b$ and 35$^d$. The negative poles of battery sections 35$^a$ and 35$^c$ are connected through wires 40$^e$ and 40$^g$ to brushes 24$^e$ and 24$^g$ which are in contact with contact plate 25$^e$. From contact plate 25$^e$ the current flows through brush 24$^e$ and wire 40$^e$ to wire 42, and from contact plate 25$^a$ the current flows through contact 29$^b$ and contact 28 to wire 45.

In the fourth position of the slide, brushes 24$^a$, 24$^b$ and 24$^c$ engage with contact strips 25$^c$, 25$^b$ and 25$^d$ respectively. Brush 24$^d$ engages with contact plate 25$^a$. Brushes 24$^f$, 24$^g$ and 24$^h$ engage with contact strips 25$^g$, 25$^f$ and 25$^h$ respectively, while brush 24$^e$ is entirely unengaged. Contact 28 engages with contact 29$^c$. From this contact the path of the current is as follows: through wire 44 from contact 29$^c$ to contact strip 25$^d$, through brush 24$^c$, battery section 35$^c$, wire 40$^g$, brush 24$^g$, contact strip 25$^f$, connection 27, contact strip 25$^b$, brush 24$^b$, wire 40$^b$, battery section 35$^b$, wire 40$^f$, brush 24$^f$, contact strip 25$^g$, connection 27, contact strip 25$^c$, brush 24$^a$, wire 40$^a$, battery section 35$^a$, to wire 42. With these connections, sections 35$^a$, 35$^b$ and 35$^c$ of the battery are connected together in series to the wires 45 and 42.

In the fifth position of the slide 26, contact 28 engages with contact 29$^d$ and the circuit is as follows; through wire 44 to contact plate 25ª, brush 24ᵈ, wire 40ᵈ, battery section 35ᵈ, wire 40ʰ, brush 24ʰ, contact strip 25ʰ, connection 27, and contact strip 25ᵈ, whence the remainder of the circuit is the same as that above described for the fourth position of the slide. In the fifth position it will be seen that the four sections of the battery are connected in series.

By placing the slide in its five different positions, four different voltages may be delivered to wires 42 and 45, the different connections as hereinbefore described being thus accomplished.

The connections through the motor controller 21 will now be described for its four different positions. In the diagrammatic view of this controller the different positions are indicated by position figures 1, 2, 3 and 4, the places indicated by the figures on the slide registering with the position line shown near the contacts.

In the first position the current flows through brush 60 from wire 45, contact 61, connection 27, contact 62, brush 63, wire 64, armature 13ᵍ, wire 66, brush 67, contact 68, wire 69, contacts 70 and 71, brushes 72, 73, 74, 75, 76 and 77, wires 78ª—78ᶠ, field coils 13ª—13ᶠ, wires 79ª—79ᶠ, brushes 80ª—80ᶠ, contacts 81 and 82, wire 83, contact 84, brush 85, to wire 42. With this system of connection the armature is placed in series with the field coils, while the field coils are individually connected in multiple.

In the second period of the slide, the contact pieces thereon are entirely out of engagement with the brushes so that the motor-generator is not only disconnected from the battery but its individual field coils are disconnected from each other and from the armature.

In the third position of the slide the current flows as follows; from wire 45 through brush 60 to contact 90, connection 27, contact 91, where the circuit branches, one branch leading through brush 63, wire 64, armature 13ᵍ, wire 66, brush 67, contact 92, wire 93, contact 94, the other branch leading through wire 95, to contact 96, brush 74, wire 78ᵈ, field coil 13ᵈ, wire 79ᵈ, brush 80ᵈ, contact 97, connection 27, contact 98, brush 73, wire 78ᵉ, field coil 13ᵉ, wire 79ᵉ, brush 80ᵉ, contact 99, connection 27, contact 100, brush 75, wire 78ᶠ, field coil 13ᶠ, wire 79ᶠ, brush 80ᶠ, contact 101, connection 27, contact 102, brush 76, wire 78ª, field coil 13ª, wire 79ª, brush 80ª, contact 103, connection 27, contact 104, brush 77, wire 78ᵇ, field coil 13ᵇ, wire 79ᵇ, brush 80ᵇ, contact 105, connection 27, contact 106, brush 72, wire 78ᶜ, field coil 13ᶜ, wire 79ᶜ, brush 80ᶜ to contact 94; at contact 94 the armature and field circuits again join and pass through wire 107 to contact 108 to brush 85 and thence to wire 42. In this connection the armature and field coils are connected in shunt relation, all the individual field coils are connected together in series. This provides for a shunt generator or motor, capable of either driving the vehicle forwardly or of charging the batteries when the vehicle drives the motor-generator forwardly. As before explained, this system of connection is extremely desirable for charging the batteries, a shunt wound generator providing a current of even voltage under varying external resistances. When traveling down grade, the motor controller may be thrown to this third position and the speed of the vehicle will be prevented from rising above a certain value. Should the speed tend to become greater, the current generated by the motor generator becomes larger and the resistance to the forward movement of the vehicle is thereby automatically increased. The energy of this resistance being returned to the battery, it is often possible to recharge the battery to a marked extent, thus greatly increasing the mileage of a single battery charge. Furthermore, the retarding force is applied in such a manner that there are practically no wearing parts, obviating the necessity of replacing such parts as brake drums and bands.

In the fourth position of the slide, the current flows from wire 45, through brush 60, contact 61ª, connection 27, contact 92ª, brush 67, wire 66, armature 13ᵍ, wire 64, brush 63, contact 91ª, wire 69, contacts 68 and 70, brushes 72, 73, 74, 75, 76 and 77, wires 78ª—78ᵉ, field coils 13ª—13ᶠ, wires 79ª—79ᶠ, brushes 80ª—80ᶠ, contacts 82 and 108, wire 83, contact 84 and brush 85 to wire 42. In this connection the armature and field coils are connected in series with each other, the field coils being connected together in multiple, but the direction of current flow in the armature is reversed in the fourth position in relation to the flow in the first position of the controller. This provides for the reverse operation of the motor to move the machine rearwardly. To place the controller in the position it is necessary to pass through the intermediate positions in which the current is first shut off from the motor and the motor is then connected to act as a generator and to be slowed down preparatory to reversing. When the reversing current is thrown into the motor, the motor has been slowed down so as to act quickly in the reverse direction.

In Figs. 7 to 10 I have illustrated in simple manner the various connections caused by the various positions of the controllers above described. In Fig. 7 I have shown the connections of the battery controller in its second position and the motor controller in its first position. In Fig. 8 I have shown the connections of the battery controller in its third position and the motor controller in its second position. In Fig.

9 the connections are shown for the battery controller in the fourth position and the motor controller in the third position; while in Fig. 10 the battery controller is diagrammed as in its fifth position while the motor controller shows in its fourth position. The first position of the battery controller is not shown, as the connections in that position are thought plainly understood from the other drawings and the specification. From these figures the circuits previously traced out may be easily followed. It will be seen that there are some superfluous wires and connections for some of the positions of the controller, these superfluous connections duplicating other connections and being ignored. Thus, in Fig. 8 it will be seen that wire 40$^c$ connecting contact 24$^e$ with contact 24$^o$ is duplicated by the dotted connection shown through the controller. The current will naturally flow through both of these connections; but for purposes of simplicity only the controller connections are followed. By the aid of these diagrams the connection scheme is greatly simplified; and this is especially so for positions one and four of the motor controller. In position two of the motor controller there is no connection whatever between any of the contacts, the motor being entirely disconnected from the battery circuit and the different windings of the motor being disconnected from each other.

I have shown an indicating instrument 150 to be mounted on the dash of the machine and to be connected in the main circuit between wires 42 and 45 for indicating both the voltage and the amperage of the current flowing. This instrument may be of ordinary construction and connected in the usual manner.

In wire 42 I have shown a circuit breaker 43 adapted to break the circuit on an overload. This circuit breaker is provided with two windings, a coarse winding 151 and a fine winding 152. As shown in Fig. 4 the coarse winding forms a part of the main circuit in series with the break, while the fine winding is connected as a shunt around the break and therefore exerts its magnetism regardless of whether the break is open or closed. If an overload should occur, the action of the coarse winding will break the circuit, the action of the fine winding not being sufficiently strong to break the circuit. This action is accomplished by the mechanism shown in Fig. 6. Two armature cores 153 are adapted to be drawn inwardly by the magnetism of the coils. To these cores are attached pivoted arms 154, so arranged that springs tend to throw their upper ends together and pull cores 153 apart. On the upper end of arms 154 are mounted springs 155 which carry copper and carbon contacts 156 and 157. The arrangement is such that the carbon contacts touch first and break last, taking the arc off the copper contacts. When pulled close together the magnetism of the fine coil is sufficient to hold them in that position. Thus the breaker will remain open until the circuit is opened at some other place in the line, or giving opportunity for the removal of the cause of overload.

From the foregoing it will be seen that my invention consists mainly in the provision of a means for charging an electric vehicle with the current which is ordinarily at hand. The provision of this means involves a number of other devices and mechanisms for the control of the devices used. The sliding controllers connect the batteries and motor-generator mechanism in the various manners necessary for the different conditions of operation.

The alternating current motor shown in the drawings may be either of the synchronous type or the induction type. On the dash of the machine a switch 160 is located and a cord connection 161 is provided to connect with the terminals of the switch. This cord connection may be of any desired length and have on its other end a connection plug or other device for connecting with various sorts of alternating current terminals. In the present case I have shown a two phase motor, as a motor of this class is more conveniently started than a single phase machine. The motor can be operated on a single phase current if necessary, the starting being accomplished either by hand or by means of direct current from the batteries turned into the direct current motor.

I have shown a fan 2 mounted on the forward end of the motor shaft for the purpose of cooling the motor and, mainly, the batteries while charging. In this manner I eliminate one of the undesirable features of charging—allowing the batteries to be charged in much less time than formerly.

Having described my invention, I claim:

1. In combination with a motor-generator having field and armature coils, and a storage battery, a controller for and connected to the storage battery, and a motor-generator controller connected to the battery and battery controller and connected to the field and armature windings of the motor-generator and adapted to connect said windings together in series or multiple relation.

2. In combination with a motor-generator having field and armature coils, and a storage battery arranged in sections of equal voltage, a controller for the storage battery and connected thereto to connect the said sections in series, multiple or series-multiple relation, and a motor generator controller connected to the battery and battery controller and connected to the field and armature windings of the motor-generator and adapted to connect said windings together in series or multiple relation.

3. In combination with a motor-generator having field and armature coils, and a storage battery arranged in sections of equal voltage, a controller for the storage battery and connected to the said sections to connect them in series, multiple or series-multiple, a motor generator controller comprising a set of stationary contacts and relatively movable connecting members, connections between the field and armature coils and some of the stationary contacts, and connections between other of the stationary contacts and the battery and battery controller.

4. In combination with a motor-generator having field and armature coils, and a storage battery, a controller for the motor-generator and comprising a set of stationary contacts, connections between the contacts and the field and armature coils of the motor-generator, a movable member carrying contact members adapted to engage with and connect various of stationary contacts in such manners as to connect the field and armature coils together in series or multiple relation, and connections between the motor-generator controller and the storage battery.

5. In combination with a motor-generator having field and armature coils, and a storage battery, a controller for the motor-generator and comprising a set of stationary brushes and movable contacts adapted to connect certain of the brushes together, connections between certain of the brushes and the individual field and armature coils of the motor-generator, and connections between others of the brushes and the storage battery, the movable contacts being so arranged with relation to the brushes and their connections to said field and armature coils that in different positions of the contacts the field and armature coils are connected in series and in parallel.

6. A controller system for a motor-generator having field and armature coils, comprising a set of stationary brushes, connections between the field and armature coils and certain of the brushes, a relatively movable contact carrying member having contacts thereon adapted in one position of the contact carrying member to engage with the field coil connected brushes so as to connect the field coils in multiple and to engage with the armature connected brushes to connect the multiple field coils in series with the armature, and in another position to engage with the field coil connected brushes to connect the field coils in series and to engage with the armature connected brushes to connect the series field coils in parallel with the armature coil.

7. A controller system for a motor-generator having field and armature coils, comprising a set of stationary brushes, connections between the field and armature coils and certain of the brushes, a relatively movable contact carrying member having contacts thereon adapted in one position of the contact carrying member to engage with the field coil connected brushes so as to connect the field coils in multiple and to engage with the armature connected brushes to connect the multiple coils in series with the armature, and in another position to engage with the field coil connected brushes to connect the field coils in series and to engage with the armature connected brushes to connect the series field coils in parallel with the armature coil, and in a third position to engage the field coil connected brushes to connect the field coils in multiple and to engage the armature connected brushes to connect the field and armature coils in series but in mode of connection opposite to the first series connection.

In witness that I claim the foregoing I have hereunto subscribed my name this 7th day of July 1910.

ELMORE W. BENDER.

Witnesses:
JAMES T. BARKELEW,
ELUND H. BARKELEW.